US007164892B2

(12) United States Patent
Derome et al.

(10) Patent No.: US 7,164,892 B2
(45) Date of Patent: Jan. 16, 2007

(54) DUAL-MODE TRANSMITTER FOR RAILROAD CROSSINGS

(76) Inventors: George E. Derome, 301 Mariners Hill Dr., Marshfield, MA (US) 02050; Brad R. Butterworth, 35 Oak St., Stoneham, MA (US) 02180; Thomas Macone, 6 Macone Cir., Stoneham, MA (US) 02180

( * ) Notice: Subject to any disclaimer, the term of this patent is extended or adjusted under 35 U.S.C. 154(b) by 453 days.

(21) Appl. No.: 10/826,128

(22) Filed: Apr. 16, 2004

(65) Prior Publication Data

US 2005/0009497 A1    Jan. 13, 2005

Related U.S. Application Data

(63) Continuation-in-part of application No. 10/735,525, filed on Dec. 11, 2003, which is a continuation-in-part of application No. 09/382,763, filed on Aug. 25, 1999.

(51) Int. Cl.
*H04B 1/02* (2006.01)
*H04B 1/06* (2006.01)
*H04B 1/04* (2006.01)

(52) U.S. Cl. .............. 455/91; 455/103; 455/127.4; 340/902; 340/903; 375/219

(58) Field of Classification Search ............ 455/63, 455/110, 108, 113, 59, 93, 91, 127.4, 102, 455/205, 128.3, 180.1, 99, 404.1, 124–125, 455/183.1; 340/902–905, 539; 370/527, 370/529, 320, 336
See application file for complete search history.

(56) References Cited

U.S. PATENT DOCUMENTS

| 4,942,395 | A |   | 7/1990  | Ferrari et al. |
| 5,572,201 | A |   | 11/1996 | Graham et al. |
| 5,602,868 | A | * | 2/1997  | Wilson ...................... 375/219 |
| 5,635,921 | A | * | 6/1997  | Maxwell et al. ............ 340/902 |
| 5,699,986 | A |   | 12/1997 | Welk |
| 5,729,213 | A |   | 3/1998  | Ferrari et al. |
| 5,735,491 | A |   | 4/1998  | Atkinson |

(Continued)

FOREIGN PATENT DOCUMENTS

CA    2299792 A1    2/2000

(Continued)

OTHER PUBLICATIONS

International Search Report for International Application No. PCT/US2005/012311, Aug. 17, 2005.

*Primary Examiner*—Tony T. Nguyen
(74) *Attorney, Agent, or Firm*—Cesari and McKenna, LLP; Duane H. Dreger, Esq.

(57) ABSTRACT

A transmitter receivable by broadcast band receivers in nearby vehicles, comprising a first signal generator for simultaneously providing a plurality of selectively spaced carriers having frequency spacings corresponding to the individual channels of the band to be covered and selectively providing amplitude modulation when used for the AM broadcast band, and a second signal generator providing an FM modulated signal, which when combined with the signal from the first signal generator, covers various portions of the FM broadcast band to provide complete coverage thereof. A plurality of signals are generated in a portion of a selected band and modulated, according to the selected band mode, with a pre-stored and selectable voice alarm message.

23 Claims, 5 Drawing Sheets

U.S. PATENT DOCUMENTS

| | | |
|---|---|---|
| 5,889,475 A | 3/1999 | Klosinski et al. |
| 6,232,887 B1 * | 5/2001 | Carson ....................... 340/903 |
| 6,501,393 B1 * | 12/2002 | Richards et al. ............ 340/993 |
| 2003/0058131 A1 * | 3/2003 | Grisham et al. ............ 340/907 |
| 2004/0166819 A1 | 8/2004 | Derome et al. |
| 2005/0009497 A1 | 1/2005 | Derome et al. |

FOREIGN PATENT DOCUMENTS

| | | |
|---|---|---|
| EP | 0761523 A2 | 3/1997 |

* cited by examiner

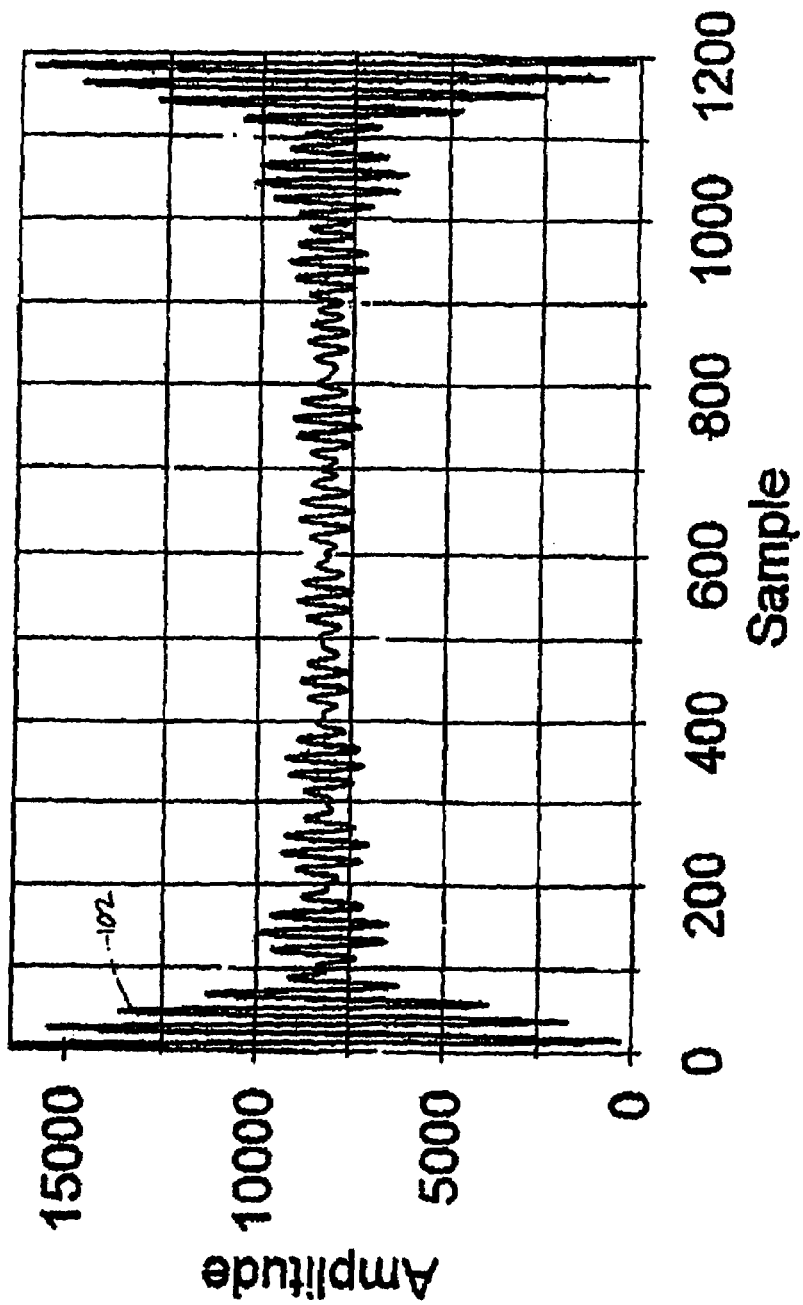

7,164,892 B2

DUAL-MODE TRANSMITTER FOR RAILROAD CROSSINGS

CROSS-REFERENCE TO RELATED APPLICATIONS

The present application is a continuation-in-part of U.S. patent application Ser. No. 10/735,525, which was filed on Dec. 11, 2003, by George Derome, et al. for a DUAL-MODE TRANSMITTER, which is a continuation-in-part of U.S. patent application Ser. No. 09/382,763, which was filed on Aug. 25, 1999, by George Derome, et al. for a DUAL-MODE TRANSMITTER and which applications are hereby incorporated by reference.

FIELD OF THE INVENTION

The present invention relates to emergency and non-emergency transmitters, in particular, to dual-mode transmitters for short-range override of commercial broadcast for use at railroad crossings.

BACKGROUND OF THE INVENTION

Conventional railroad crossings that include flashing lights, audible alarms and moving arms that block a road crossing help ensure that automobiles do not cross a railroad track while a train is approaching. However, such conventional railroad crossing apparatus is expensive to install and maintain, especially in the large numbers required along the length of railroad tracks across the continental United States.

Railroad warning systems that lack movable arms to physically obstruct the roadway are less expensive and are commonplace, especially in rural areas. However, in modern automobiles, the audible sounds may not be heard, especially if the driver is listening to a radio while driving. In such situations, a driver of an automobile may not hear the audible warning bells from the railroad crossing, which may result in a catastrophic locomotive-automobile collision. One solution is to replace the audible warning systems with a tone-modulated radio transmitter that will alert automobile drivers listening to their radio of an approaching train.

Simple tone-modulated warning transmitters which sweep the broadcast bands often sound like common man-made interference, thereby offering insufficient information to the listener to determine that there is an emergency and what action could or should be taken. Moreover, if the listener cannot determine that a train is approaching, such simple warning systems will only distract and annoy the listeners, causing them to be even less responsive to the approaching train. Also, the sweep or stepping of a single carrier through the broadcast band(s) favors simple alarm tone modulation as alarm voice messages would never be heard in their entirety if complete coverage of the broadcast band(s) by a single swept carrier is to be provided in reasonable time.

Full band transmissions which saturate the entire broadcast band(s) require significant amounts of carefully controlled radiated power to be effective at anyone frequency. Such high power requirements are not well suited to railroad crossing applications, where the power is typically supplied by battery and/or solar power arrays.

SUMMARY OF THE INVENTION

The disadvantages of the prior art are overcome by providing a dual-mode transmitter for railroad crossings. The dual-mode transmitter may be located on a railroad crossing pole or otherwise in the vicinity of a railroad crossing. A control transmitter located on an approaching locomotive sends a control signal to the dual-mode transmitter. A control module within the dual-mode transmitter receives the control signal and activates the dual-mode transmitter to transmit an audio message alerting automobiles within range of the transmitter.

The transmitter according to the present invention comprises a first signal generator for simultaneously providing a plurality of selectively (e.g. regularly or arbitrarily) spaced carriers having frequency spacings corresponding to the individual channels of the band to be covered and selectively providing amplitude modulation when used for the AM broadcast band, and a second signal generator providing an FM modulated signal, which when combined with the signal from the first signal generator, covers various portions of the FM broadcast band to provide complete coverage thereof. Thus, the present invention provides a frequency-agile, multi-carrier, multi-mode and multi-band alarm transmitter having a selectable voice message which overrides broadcast signals as received by vehicle listeners in the vicinity of the railroad crossings.

A plurality of signals are generated in a portion of a selected band and modulated, according to the selected band mode, with a pre-stored and selectable voice alarm message(s). According to the present invention, the portion of the band is changed to provide coverage of the entire broadcast band, the broadcast band is also changed, and/or the message is changed to provide effective emergency notification to vehicles and/or listeners in proximity (up to a maximum legal range) of the responding emergency vehicle issuing the alarm transmission.

A second control transmitter, typically located on the last train of the locomotive, sends a second control signal as it passes the railroad crossing. The second control signal (or completion signal) is received by the control module of the dual-mode transmitter, which then deactivates its transmission.

BRIEF DESCRIPTION OF THE DRAWINGS

The above and further advantages of invention may be understood by referring to the following description in conjunction with the accompanying drawings in which like reference numerals indicate identical or functionally similar elements:

FIG. 2A is a time-domain plot of a non-optimized waveform relevant to the first signal generator of the embodiment of FIG. 1;

DETAILED DESCRIPTION OF AN ILLUSTRATIVE EMBODIMENT

In accordance with the illustrative embodiment of the present invention, the dual-mode transmitter is configured to utilize a separate control receiver/module and antenna to communicate with the control transmitter. However, it is expressly contemplated that in alternate embodiments, a single antenna may be utilized for both the control module and for the transmitter.

Figure 1:
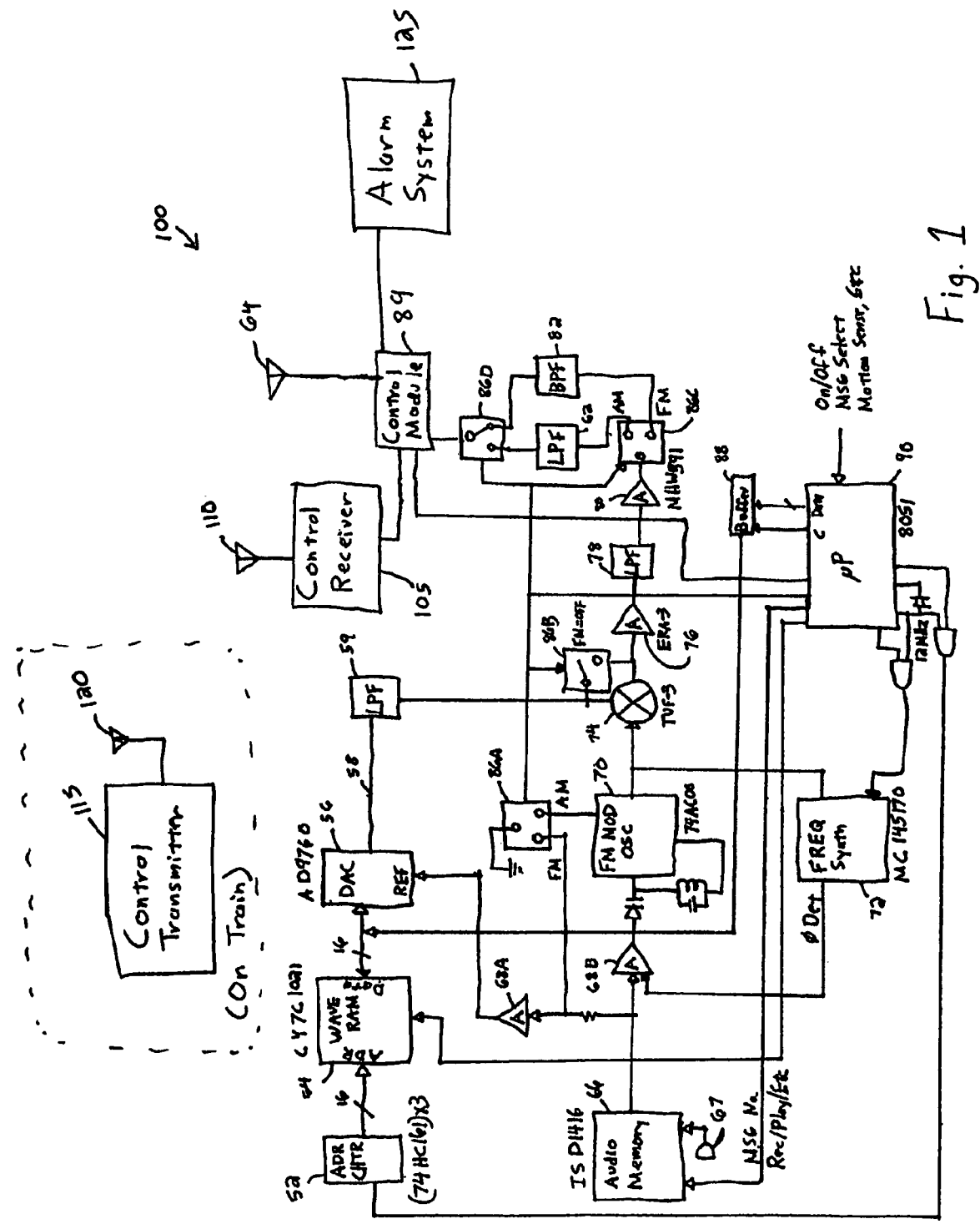
FIG. 1 is a schematic block diagram of an exemplary embodiment of the present invention.

One embodiment 100 of the dual-mode alarm transmitter according to the present is shown in FIG. 1, wherein an Amplitude Modulated (AM) signal is provided which has frequency components substantially coinciding with the individual channel frequencies in the AM broadcast band and in sufficient plurality to cover substantially the entire AM broadcast band. A wave shape, preselected for particular spectral components is loaded into a wave RAM 54 from the microprocessor 90 via buffer 88 when the transmitter is prepared for transmission into a particular broadcast band. The data output from the wave RAM 54 is received by a digital-to-analog converter (DAC) 56 which provides an analog output signal having the desired frequency components, and provides amplitude modulation (via the DAC reference signal input) according to an analog message signal received.

The analog message signal is provided by an analog audio memory 66 (or equivalent) such as an ISD1416, which provides one or more pre-stored or recordable voice, tone or other audible messages as controlled by the microprocessor 90. In addition, a microphone 67 signal may be substituted by manual switch override (not shown) for broadcast of explicit emergency directions or other information.

The wave RAM 54 is clocked (sequentially addressed by counter 52) at a high rate, e.g. at least several MHz when enabled by the microprocessor 90 to provide a DAC signal output 58 in the range of interest, e.g. 100 KHz to 4 MHz in the present embodiment. A low-pass filter (LPF) 59 (Fc=4 MHz) follows to remove any incidental spurious signals from the DAC output 58.

According to this embodiment of the present invention, the waveform stored in the wave RAM 54 is clocked at a substantially constant rate, yet produces a DAC 56 output signal having selected frequency components which substantially coincide with selected AM channels (e.g. every 10 KHz) over substantially the entire AM broadcast band. Alternate embodiments provide segmenting the AM broadcast band into multiple, periodically selected band sections comprising contiguous blocks of frequency components for contiguous channels, for interleaved groups of frequencies (e.g. every other band channel) or for combinations thereof, and may be provided by selected waveforms stored in the wave RAM 54. In the embodiments providing alternating groups of frequencies, another specified waveform is loaded into the wave RAM 54 for the selected corresponding frequency set.

Figure 2B:
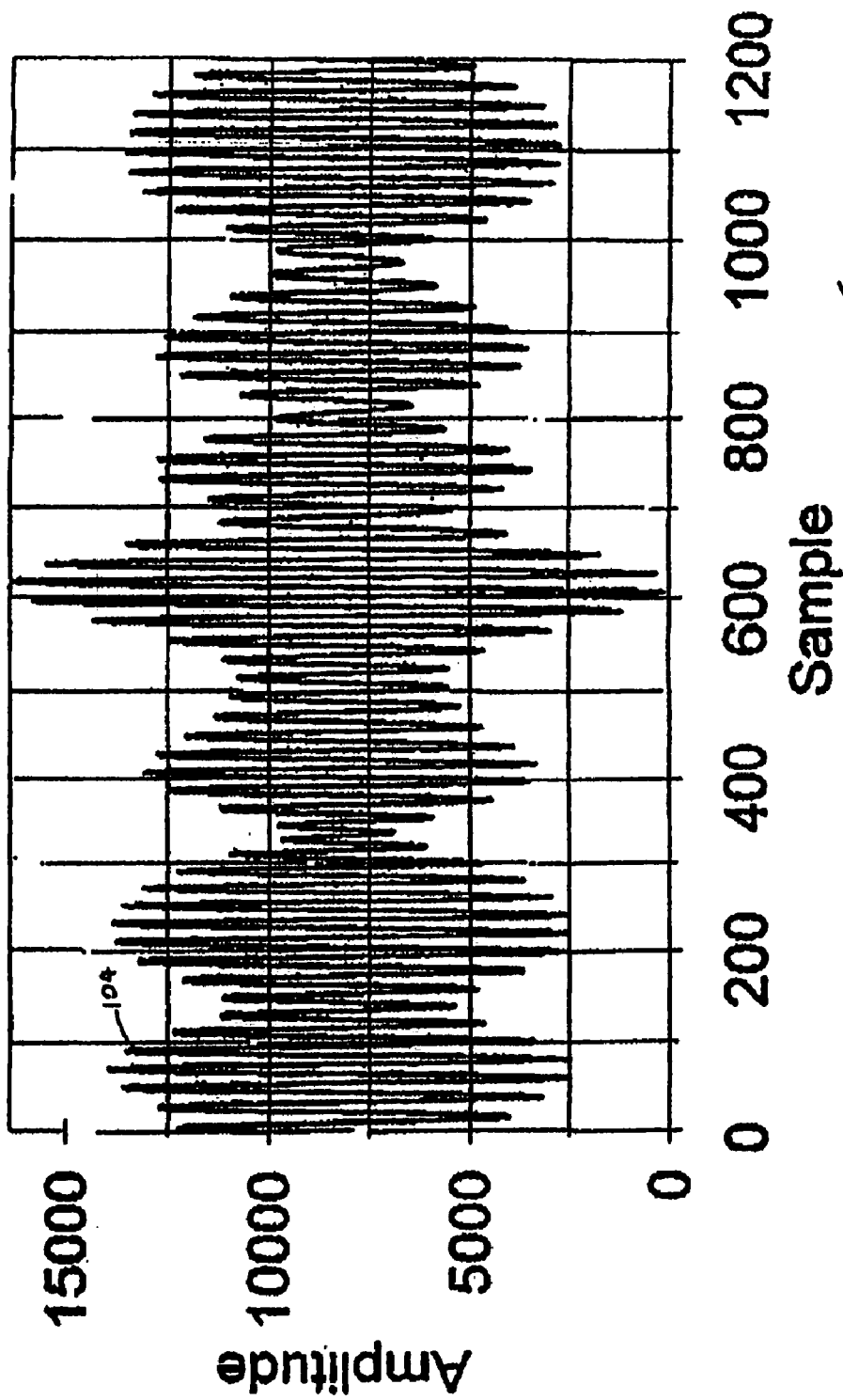
FIG. 2B is a time-domain plot of an optimized waveform relevant to the first signal generator of the embodiment of FIG. 1.

The exemplary wave shape providing the desired frequency composition (e.g. at the broadcast band channel and spacing frequencies), is exemplified by waveform 102, which has a crest factor ratio of maximum to minimum signal, (e.g. 4.8 for FIG. 2A) provides undesired modulation clipping and other non-linearities resulting in undesired intermodulation products, wasting energy at the transmitted output and providing spurious spectral output which would require additional filtering to remove or reduce such unwanted spectral components to acceptable levels. According to the present invention, the exemplary waveform 104 (FIG. 2B) has adjusted carrier phase relationships to provide the desired output signals and provide a markedly improved crest factor (e.g. from 4.8 to 2.6 for the waves shown) to reduced transmitted signal intermodulation products and to spread the remaining intermodulation products over a wider band of frequencies at a lower amplitude.

According to an illustrative embodiment of the present invention, the set of carriers to be produced is selected (to coincide with the desired band frequencies) as a sum of sine waves. Then, the phase of each wave s changed randomly in a Monte Carlo-style process. After each set of random changes to each set of carriers, a figure of merit (e.g. amplitude variance) is computed. The figure of merit is computed by dividing a trial waveform into segments (e.g. ten) in the time domain, and the RMS voltage is computed for each of the segments. The statistical variance (i.e. the figure of merit) is computed for the set of RMS voltages, and minimized to spread the energy in the waveform evenly in the time domain. The process repeats until the figure of merit ceases to improve significantly.

Thus the crest factor is reduced, providing a 20 dB to 40 dB reduction in the peak amplitudes of the intermodulation products outside the frequency range of the set of carriers being produced, depending on the spacing of the carriers and results of the optimization process. Alternate embodiments according to the present invention provide a wave shape further optimized by varying randomly the center frequencies of each carrier by a small amount (e.g 0.1% to 1.0%), which further spreads out the intermodulation products, yielding an additional 5–10 dB reduction in the peak value of each intermodulation product in some frequency regions. Moreover, the small variation in center frequency is insignificant to the reception of the transmitted signal.

The amplitude-modulated signal provided by the DAC 56 is amplified by amplifiers 76, 80 and sent via switch 86B, or via the mixer 74 with the oscillator 70 disabled, to the switch 84 via switches 86C and 86D, and low-pass filters 80 and 62 (Fc=1.2/1.6 MHz) to restrict the radiated power to the (AM) band to be covered. The amplifiers 76, 80 are typically IC or discrete components selected to provide a sufficient AM power output, i.e. several hundred milliwatts in this embodiment.

A frequency modulated multi-carrier alarm signal is provided in the present embodiment 100 by loading the wave RAM 54 with a signal having frequency components which coincide to multiples of the FM broadcast band channel spacing, e.g. 200 KHz in the U.S., and a sufficient bandwidth to cover a substantial portion of the FM band, e.g. 4 MHz and having the desired crest factor as described, above. The DAC 56 output signal is received by a mixer which also receives a selectable frequency signal from a frequency synthesizer, comprising a voltage controlled oscillator (VCO) 70, amplifier 68B and frequency synthesizer divider and phase detector 72, as controlled by the microprocessor 90. The mixer 74 provides both upper and lower sidebands from the signals mixed. For example, a 4 MHz wide signal (from DAC 56) and a 92.1 MHz signal from the VCO 70 provides a broad group of signals within the range of 88.1–96.1 MHz, thereby covering a substantial portion of the FM band. The frequency synthesizer is then adjusted by the microprocessor 90 to provide a higher frequency signal, e.g. 98 MHz to provide a mixer 74 output signals in the range of 94.1–102.1 MHz, and then a final VCO frequency, e.g. 104 MHz to provide coverage of the remaining 100.1–107.9 MHz portion of the FM band, with overlap (as illustrated) if desired.

The many signals from the mixer 74 within the portion (e.g. 8 MHz wide) of the FM band are all simultaneously frequency modulated by adding an audio signal from the audio memory 66 to the amplifier 68B which also receives the phase detector (error) signal used within the frequency synthesizer circuit. The FM signals from the mixer 74 are received by the switch 84 via switches 86C and 96D after sufficient amplification by amplifiers 76, 80 and filtering by low-pass (Fc=120 MHz) and band-pass filters (80–120 MHz), 78 and 82 respectively, to provide an acceptable FM transmitted signal of several hundred milliwatts power, in the present embodiment of FIG. 1. While the present embodiment incorporates wide-band, linear amplifiers 76, 80 for both the AM and FM bands, alternate embodiments may comprise separately configured amplifiers for the respective band and mode of modulation.

In accordance with the illustrative embodiment, a control antenna 110 is connected to a control receiver 105 for reception of control transmissions from onboard trains. The control receiver 105 receives transmissions from a control transmitter 115 and associated antenna 120 located onboard a locomotive. The control receiver feeds received signals to a control module 89 for processing. When the control module detects an initial control signal, the control module 89 activates the dual-mode transmitter and begins broadcasting the stored message. When the radiated AM/FM signal is radiated, the antenna 64 is selected by control module 89. When AM band coverage is desired, switches 86A and 86B disable the FM signal from proceeding by grounding, and when FM band coverage is desired, the AM signal is inhibited, or grounded as shown, at points in the signal path, such as before the power amplifiers 60 and 80 and elsewhere, which prevent emission of the AM signal and prevent AM modulation of the DAC 56 output.

Figure 3:
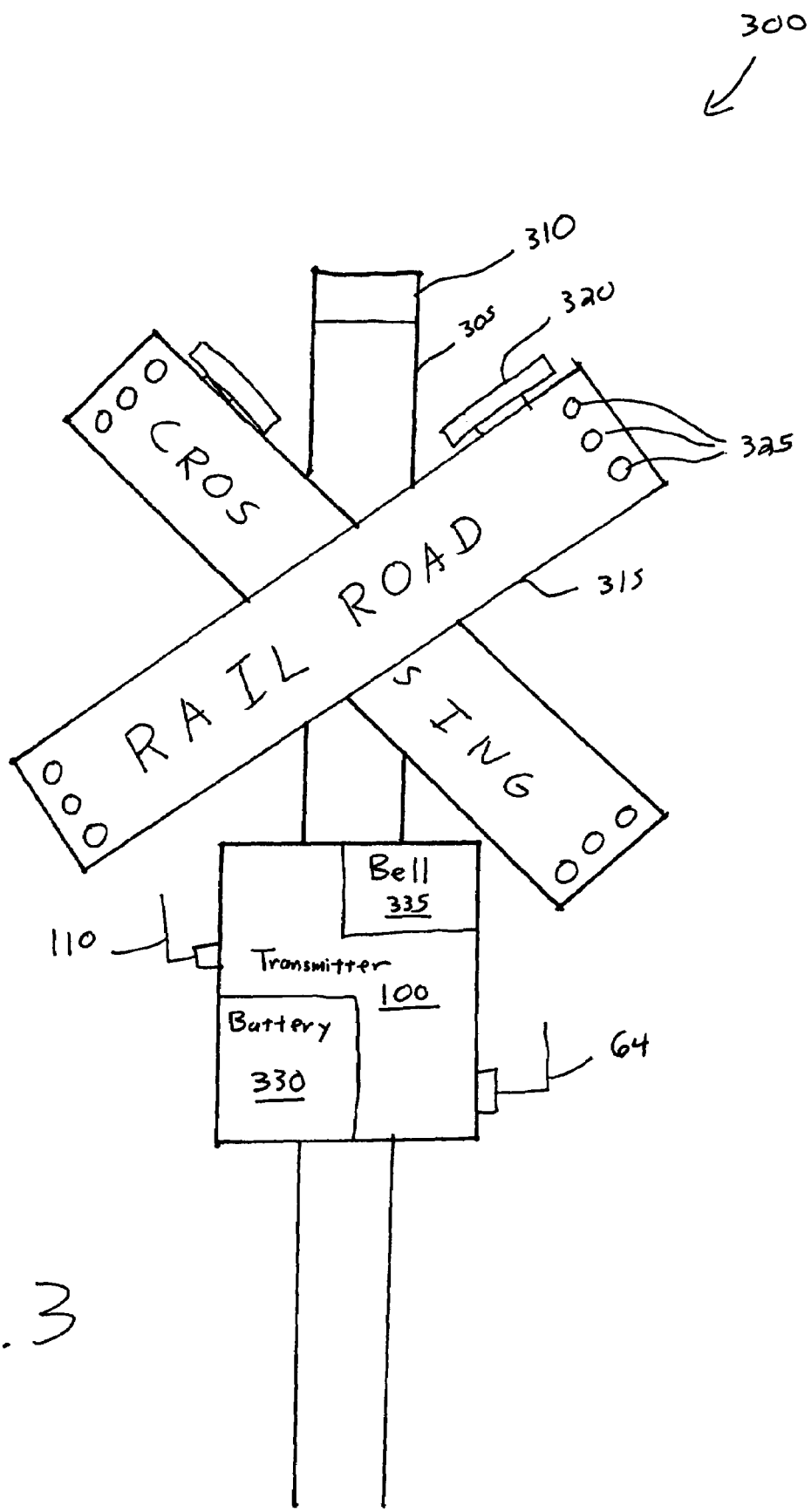
FIG. 3 is a schematic block diagram of an exemplary railroad crossing warning system showing placement of a dual-mode transmitter in accordance with an embodiment of the present invention.

FIG. 3 is a schematic block diagram of an exemplary railroad warning system in accordance with an embodiment of the present invention. The warning system 300 includes a pole 305, which is typically mounted alongside a railroad-roadway intersection. The pole may include a flashing strobe light 310 along with a set of crossed arms 315. On the crossed arms may be a number of warning lights 325. A series of solar panels 320 may also be mounted on the crossed arms. In the illustrative embodiment, the solar panels provide power to recharge battery 330, which powers the novel transmitter 100. The transmitter is incorporated into a housing that includes, inter alia, the battery 330 and a warning bell 335 to generate an audible alarm when a train is approaching.

Figure 4:
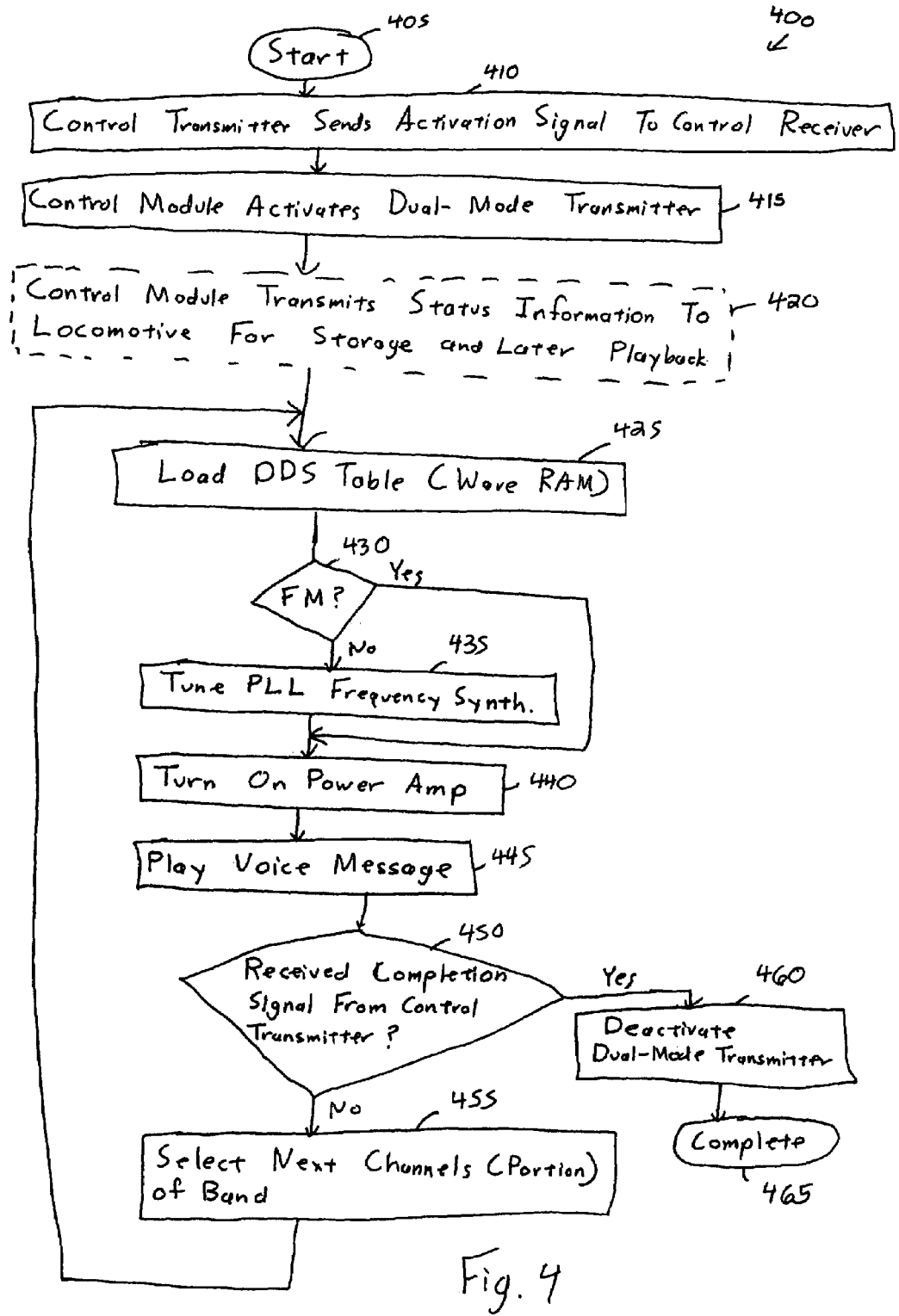
FIG. 4 is a flowchart detailing the steps of procedure performed in utilizing the dual-mode transmitter in accordance with an embodiment of the present invention.

FIG. 4 shows the steps of an exemplary procedure 400 performed by a program executing on the microprocessor 90 in this illustrative embodiment. The procedure begins in step 405 and continues to step 410 where the control transmitter located onboard the locomotive send an activation signal to the control receiver located in the dual-mode transmitter. The control receiver passes the received command to the control module, which then (in step 415) activates the dual-mode transmitter. In optional step 420, the control module in the dual-mode transmitter transmits status information to the locomotive for storage. In one embodiment, the dual-mode transmitter collects status information, such as battery level, error conditions, etc. that is then transmitted to the locomotive. The status information may be stored onboard the locomotive's control transmitter until it reaches a train station. At such time, an engineer may retrieve the stored information and plan maintenance accordingly.

The selection of the predetermined waveform for the corresponding AM or FM band or band segment is determined at step 425 by the microprocessor 90. If the band or band portion is in the FM band, step 430, the Phase-Locked Loop frequency synthesizer is tuned at step 435 for the appropriate frequency as discussed above. The FM power amplifier 80 is enabled at step 440 and the voice (audio) message is selected and begun at step 445. Once the message is played, the control module determines if a completion signal has been received from a control transmitter in step 450. If there has been a completion signal received, the procedure branches to step 455 where the control module deactivates the dual-mode transmitter. At this point the procedure is complete (step 460).

However, if no completion signal has been received, the procedure continues to step 450, where the next set of frequencies is selected. Once the next set of frequencies has been selected, the procedure branches back to step 420 and continues. According to the preferred embodiment, the selection of the various AM and FM band or band portions is selected in a permutation to provide non-sequential band coverage, yet frequently enough to provide a message to all portions of the AM and FM broadcast band. In the present embodiment, the transmitter according to the present invention provides complete coverage of the U.S. AM and FM broadcast bands within 9 seconds for a 1.5 second message with each of the two bands covered in thirds.

To again summarize, the present invention provides a dual-mode transmitter for use in railroad crossings. An on-locomotive control transmitter broadcast a control signal but it is received by control receiver integrated with the dual-mode transmitter. Upon activation, the dual-mode transmitter broadcast a predefined voice message alerting radio listeners within the reception range of an approaching train to the crossing. A second control transmitter, typically located on a caboose or last car of a train transmits a second completion signal to the dual-mode transmitters control receiver. Upon receipt of the completion signal, the dual-mode transmitter deactivates its transmission.

While the present embodiment is implemented partially in analog and partially in digital circuitry, alternate embodiments which include corresponding equivalent digital (e.g. a digital audio memory and/or amplitude modulator, etc.) or analog circuitry (e.g. a portion of the control unit, or wave RAM, etc.) are also within the scope of the present invention. Modifications and substitutions of the present invention by one of ordinary skill in the art are within the scope of the invention, which is not to be limited except by the claims which follow.

What is claimed is:

1. An apparatus for use at railroad crossings comprising:
   a control receiver for detecting activation and completion signals from a control transmitter;
   a multi-signal generator for simultaneously providing a plurality of signals within a portion of a selected frequency band and having a center frequency and relative frequency spacing of said simultaneous plurality of signals, wherein said multi-signal generator is a variable multi-signal generator for selectively adjusting said center frequency to cause said plurality of signals to cover a differing of the selected frequency band;
   a modulator connected to said multi-signal generator for selectively and simultaneously modulating said plurality of signals;
   a control unit for selectively controlling said multi-signal generator center frequency; and
   wherein the transmitter begins transmission upon receipt of the activation signal and ceases transmission upon receipt of the completion signal.

2. The apparatus of claim 1, wherein said multi-signal generator further includes a wave memory for reproducing a selected waveform output signal providing said plurality of signals.

3. The apparatus of claim 2, wherein said wave memory output signal comprises a plurality of signals corresponding to a different portion of said selected band.

4. The apparatus of claim 3, wherein said control unit provides prestored waveforms selectively transferred to said wave memory to provide said plurality of signals on a corresponding portion of said selected band.

5. The apparatus of claim 2, further including a waveform converter connected to receive said reproduced selected waveform output signal and provide a converted output signal.

6. The apparatus of claim 1 wherein the activation and completion signals originate from a control transmitter located onboard a locomotive.

7. The apparatus of claim 1 wherein said plurality of signals comprises an audio message warning of an approaching locomotive.

8. The apparatus of claim 2, further including a programmable signal generator providing a programmable output signal and a mixer receiving said programmable output signal and said converted output signal and providing a mixer output therefrom, wherein said programmable output signal is selectively varied to provide a plurality of signals at different portions of a selected band.

9. The apparatus of claim 8, wherein said programmable signal generator is controlled by said control unit to selectively provide different output signals, which when received by said mixer, provides said plurality of signals corresponding to substantially all of said selected frequency band.

10. The apparatus of claim 9 further including a frequency modulator connected to said programmable signal generator for frequency modulating the output signal thereof according to an audio signal.

11. The apparatus of claim 8, further including a power amplifier selectively receiving from one of said mixer output signal and said converted signal, and providing a transmitter output signal.

12. A dual-mode transmitter for use at railroad crossing, comprising:
 a first signal generator for simultaneously providing a plurality of carrier signals within a frequency band and having a relative frequency spacing, and including an amplitude modulator of said plurality of said plurality of signals according to a modulation signal;
 a second signal generator for selectively providing a selectable frequency signal, and including a frequency modulator of said selectable frequency according to a modulation signal;
 a mixer receiving the output signals of said first and second signal generators, and providing an output signal;
 a power amplifier for selectively receiving said signals corresponding to said plurality of signals from said first signal generator and said mixer output signal, providing a signal to an antenna according to said selectively received signal;
 a control means for selectably enabling said first signal amplitude modulator in a first mode, and said second signal generator frequency modulator in a second mode; and
 means for detecting an activation signal and a completion signal; and means for activating the dual-mode transmitter in response to receipt of the activation signal and for deactivating the dual-mode transmitter in response to receipt of the completion signal.

13. The transmitter of claim 12 further comprising an audio source comprising one of an audio memory for providing a prestored audio signal selected by said control unit, and a microphone, said audio source being selectively connected to said amplitude modulator and said frequency modulator.

14. The transmitter of claim 12, wherein said first signal generator comprises means for providing a plurality of signals in selected portions of said frequency band according to said control unit wherein said selected portions substantially comprise said frequency band.

15. The transmitter of claim 12, wherein said first signal generator comprises means for providing a plurality of signals in at least one selected portion of said frequency band according to said control unit, and said second signal generator provides said selectable frequency signal according to said control unit, wherein said mixer output signals comprise selected portions which substantially comprise said frequency band.

16. A method for transmitting an alert of an approaching locomotive, the method comprising the steps of:
 sending, by a control transmitter located on the locomotive, an activation signal to a control receiver;
 activating, by a control module operatively interconnected with the control receiver, a dual-mode transmitter adapted to transmit a warning message across one or more broadcast bands;
 deactivating, by the control module upon receipt of a completion signal from the control transmitter, the dual-mode transmitter.

17. The method of claim 16 wherein the warning message is stored as a prestored waveform in a wave memory in a wave memory of the dual-mode transmitter.

18. The method of claim 17 wherein the step of activating the dual-mode transmitter further comprises the steps of:
 (a) loading a predetermined waveform;
 (b) tuning a phase-locked loop frequency synthesizer to an appropriate frequency;
 (c) activating a power amplifier;
 (d) playing the warning message over a portion of the one or more broadcast bands;
 (e) selecting a next portion of the one or more broadcast bands; and
 (f) looping to step (a).

19. An apparatus for use at railroad crossings comprising:
 a control receiver;
 a multi-signal generator;
 a modulator connected to said multi-signal generator; for selectively and simultaneously modulating said plurality of signals;
 a control unit; for selectively controlling said multi-signal generator center frequency; and
 wherein the multi-signal generator simultaneously provides a plurality of signals within a portion of a selected frequency band and having a center frequency and relative frequency spacing of said simultaneous plurality of signals and wherein said multi-signal generator is a variable multi-signal generator for selectively adjust ing said center frequency to cause said plurality of signals to cover a differing of the selected frequency band.

wherein the transmitter begins transmission upon receipt of the activation signal and ceases transmission upon receipt of the completion signal.

20. The apparatus of claim 19 wherein the control receiver is adapted to detect an activation signal and a completion signal from a control transmitter; and wherein the apparatus begins transmission upon receipt of the activation signal and ceases transmission upon receipt of the completion signal.

21. The apparatus of claim 1, wherein said multi-signal generator further includes a wave memory for reproducing a selected waveform output signal providing said plurality of signals.

22. The apparatus of claim 21, wherein said wave memory output signal comprises a plurality of signals corresponding to a different portion of said selected band.

23. The apparatus of claim 22, wherein said control unit provides prestored waveforms selectively transferred to said wave memory to provide said plurality of signals on a corresponding portion of said selected band.

* * * * *